US012597384B2

(12) United States Patent
Akimoto

(10) Patent No.: US 12,597,384 B2
(45) Date of Patent: Apr. 7, 2026

(54) LIGHT-EMITTING DEVICE AND METHOD FOR DRIVING THE SAME

(71) Applicant: NICHIA CORPORATION, Anan (JP)

(72) Inventor: Hajime Akimoto, Anan (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 18/986,230

(22) Filed: Dec. 18, 2024

(65) Prior Publication Data

US 2025/0239212 A1 Jul. 24, 2025

(30) Foreign Application Priority Data

Dec. 25, 2023 (JP) ................................ 2023-218221

(51) Int. Cl.
*G09G 3/32* (2016.01)

(52) U.S. Cl.
CPC ........... *G09G 3/32* (2013.01); *G09G 2310/08* (2013.01); *G09G 2320/0242* (2013.01); *G09G 2320/0666* (2013.01)

(58) Field of Classification Search
CPC ................. G09G 3/32; G09G 2310/08; G09G 2320/0242; G09G 2320/0666; G09G 3/2081; G09G 3/2022; G09G 2300/0452; G09G 3/2003; G09G 2310/0235; G09G 3/30; H05B 45/20; H01L 25/075
See application file for complete search history.

(56) References Cited

U.S. PATENT DOCUMENTS

| | | | | |
|---|---|---|---|---|
| 6,429,601 B1 * | 8/2002 | Friend | G09G 3/3258 | 345/82 |
| 10,885,834 B2 | 1/2021 | Akimoto | | |
| 2014/0246982 A1 * | 9/2014 | Araki | G09G 3/3406 | 315/151 |
| 2020/0043405 A1 * | 2/2020 | Akimoto | G09G 3/32 | |
| 2021/0091268 A1 | 3/2021 | Dierolf et al. | | |
| 2025/0133870 A1 * | 4/2025 | Zhu | H10H 20/01335 | |

FOREIGN PATENT DOCUMENTS

| | | |
|---|---|---|
| JP | 2006-344913 A | 12/2006 |
| JP | 2007-080998 A | 3/2007 |
| JP | 2010-008769 A | 1/2010 |
| JP | 6788088 B2 | 11/2020 |
| JP | 2021-052168 A | 4/2021 |

* cited by examiner

*Primary Examiner* — Chanh D Nguyen
*Assistant Examiner* — Gloryvid Figueroa-Gibson
(74) *Attorney, Agent, or Firm* — Foley & Lardner LLP

(57) ABSTRACT

A light-emitting device includes: a display comprising a plurality of pixels in which a plurality of light-emitting elements are arranged in a predetermined pattern, a light emission color of each of the plurality of light-emitting elements being variable in accordance with a drive current; and a lighting controller configured to supply a drive current to each of the plurality of light-emitting elements and control a light emission period of each of the plurality of light-emitting elements. The lighting controller is configured to: divide one frame, in which the lighting controller drives the plurality of light-emitting elements to emit light, into a first subframe and a second subframe, drive the plurality of light-emitting elements to emit light of a first light emission color in the first subframe, and drive the plurality of light-emitting elements to emit light of a second light emission color in the second subframe, the second light emission color being different from the first light emission color.

10 Claims, 7 Drawing Sheets

LIGHT-EMITTING DEVICE AND METHOD FOR DRIVING THE SAME

CROSS-REFERENCE TO RELATED APPLICATIONS

This application is based upon and claims priority to Japanese Patent Application No. 2023-218221, filed on Dec. 25, 2023, the entire contents of which are incorporated herein by reference.

BACKGROUND

The present disclosure relates to a light-emitting device and a method for driving the light-emitting device.

Displays and surface light-emitting devices using semiconductor light-emitting elements, such as LEDs and LDs, are used. Here, to manufacture a full-color LED display, it is generally necessary to arrange sub-pixels of at least the three colors of RGB for each of pixels. However, in such a configuration, because it is necessary to provide at least three times as many of the sub-pixels as the pixels, this configuration is not suitable for high definition, and there are problems such as high cost and a decrease in yield due to the increase in the number of LEDs.

On the other hand, a micro-LED display has been reported that causes a single LED element to emit multicolor light (see JP 2021-52168 A). However, with respect to configuring a display using such a multicolor light-emitting micro-LED, an actual circuit configuration and driving method have not yet been reported. For example, it has not been easy in the current technology of controlling a multicolor light-emitting micro-LED to emit light in all chromaticity ranges of RGB.

It is an object of an aspect of the present disclosure to provide a light-emitting device and a method for driving the light-emitting device that can implement appropriate light emission color control when configuring a light-emitting device, such as a display, using multicolor semiconductor light-emitting elements. It is an object of another embodiment to provide a light-emitting device in which occurrence of color separation is suppressed and a method for driving the light-emitting device. Note that the description of these objects does not exclude the existence of other objects. An aspect of the present disclosure does not necessarily achieve all of the objects. Other objects can be derived from the description of the specification, the drawings, the claims, and the like of the present disclosure.

SUMMARY

A light-emitting device according to an aspect of the present disclosure includes a display including a plurality of pixels in which a plurality of light-emitting elements are arranged in a predetermined pattern, a light emission color of each of the plurality of light-emitting elements being variable in accordance with a drive current, and a lighting controller that supplies a drive current to each of the plurality of light-emitting elements and controls a light emission period. The lighting controller divides one frame into a first subframe and a second subframe and drives the plurality of light-emitting elements, the one frame being a frame to drive the plurality of light-emitting elements to emit light, the first subframe being a subframe to drive each of the plurality of light-emitting elements to emit light of a first light emission color, the second subframe being a subframe to drive each of the plurality of light-emitting elements to emit light of a second light emission color different from the first light emission color.

A method for driving a light-emitting device according to another aspect of the present disclosure is for driving a light-emitting device including a display including a plurality of pixels in which a plurality of light-emitting elements are arranged in a predetermined pattern, a light emission color of each of the plurality of light-emitting elements being variable in accordance with a drive current, an information storage that stores current-chromaticity information for determining, in accordance with a specific light emission color of a light-emitting element of the light-emitting elements, a drive current value to drive the light-emitting element to emit light of a first light emission color or a second light emission color different from the first light emission color, and a lighting controller that supplies a drive current to each of the plurality of light-emitting elements and controls a light emission period of each of the plurality of light-emitting elements. The method includes, by the lighting controller, dividing one frame into a first subframe and a second subframe and driving the plurality of light-emitting elements, the one frame being a frame to drive the plurality of light-emitting elements to emit light, the first subframe being a subframe to drive each of the plurality of light-emitting elements to emit light of the first light emission color, the second subframe being a subframe to drive each of the plurality of light-emitting elements to emit light of the second light emission color.

With the above configuration, multicolor light emission such as full-color light emission can be achieved by using a light-emitting element whose light emission color can be controlled in accordance with a drive current, and occurrence of color separation can be suppressed by separately displaying the light emission color in subframes.

DETAILED DESCRIPTION

Figure 1:
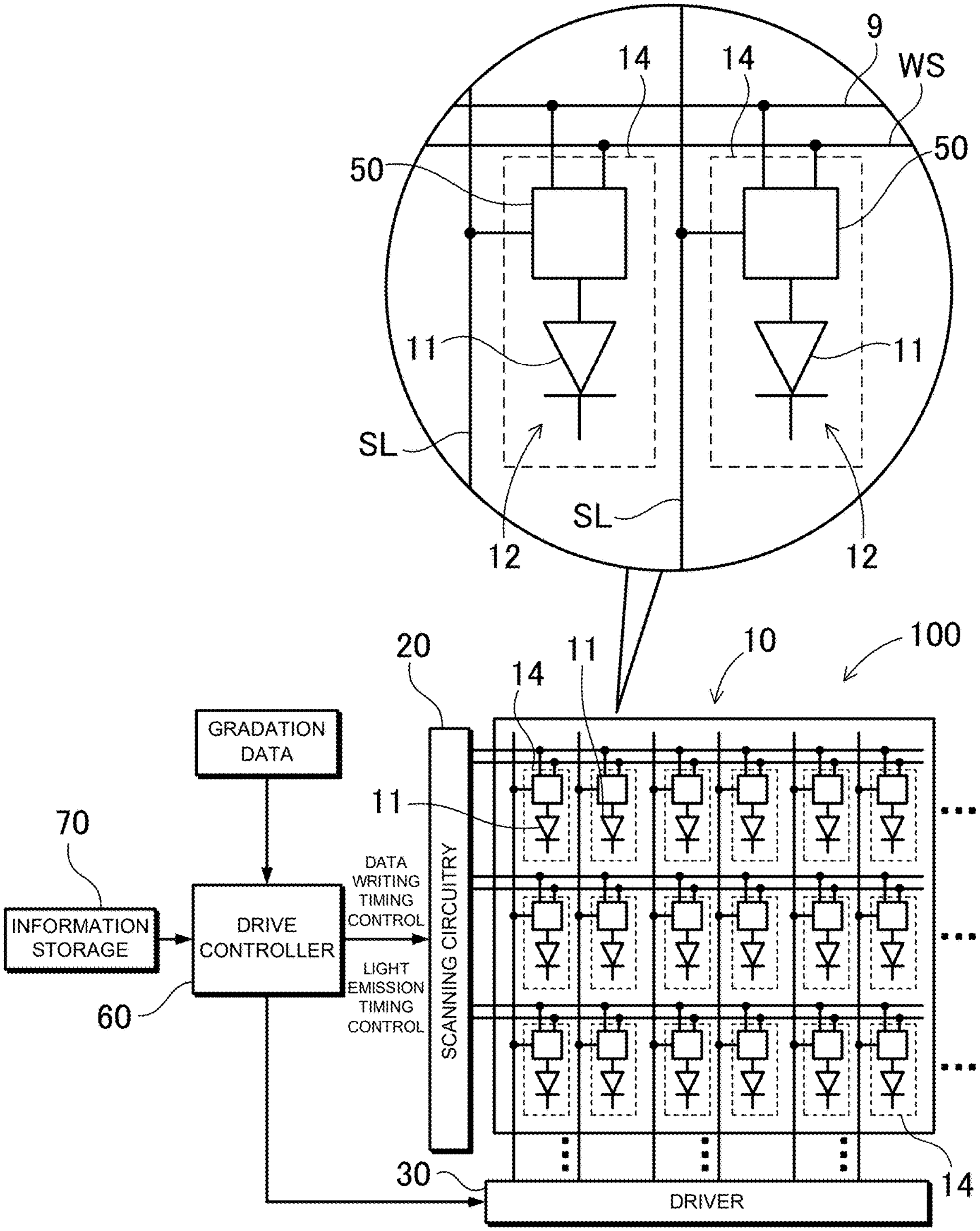
FIG. 1 is a block diagram illustrating a light-emitting device according to a first embodiment.

Embodiments of the present disclosure are described in detail below with reference to the drawings. In the following description, terms indicating specific directions and positions (for example, "upper," "lower," and other terms including these terms) are used as necessary; however, the use of these terms is to facilitate the understanding of the invention with reference to the drawings, and the technical scope of the present disclosure is not limited by the meaning of these terms. Parts having the same reference characters appearing in a plurality of drawings indicate identical or equivalent parts or members.

The following embodiments show specific examples of the technical idea of the present disclosure, and the present disclosure is not limited to the following embodiments. Unless otherwise specified, the dimensions, materials, shapes, relative arrangements, and the like of constituent elements to be described below are not intended to limit the scope of the present disclosure only thereto, but rather to provide examples. The contents to be described in an embodiment and an example can be applied to another embodiment and another example. The size, positional relationship, and the like of the members illustrated in the drawings can be exaggerated to clarify the explanation.

First Embodiment

A block diagram of a light-emitting device 100 according to a first embodiment is illustrated in FIG. 1. The light-emitting device 100 illustrated in this drawing includes a display 10, a driver 30, lighting controllers 50, an information storage 70, a scanning circuitry 20, and a drive controller 60.

The display 10 includes a plurality of light-emitting elements 11 arranged in a predetermined pattern. Each light-emitting element 11 constitutes a pixel 12. Specifically, the plurality of light-emitting elements 11 are arranged in a matrix. A period during which image data for one frame is displayed on a screen formed by the pixels 12 arranged in a matrix may be referred to as a vertical scanning period, and a period obtained by dividing the vertical scanning period by the number of rows of the screen may be referred to as a horizontal scanning period. For example, in the horizontal scanning period, a voltage value for power supply control of the pixels 12 arranged in a row direction (X-axis direction) is set, and a voltage value for analog image data is set. In the vertical scanning period, the scanning circuitry 20 that scans the pixels 12 is sequentially shifted in a column direction (Y-axis direction). The light-emitting device 100 in FIG. 1 adopts an active matrix driving method as a lighting driving method for lighting each pixel 12.

Each pixel 12 is constituted by one light-emitting element 11. In the example illustrated in FIG. 1, the pixel 12 includes one light-emitting element 11. However, the present disclosure is not limited to this configuration, and one pixel may be configured by a plurality of light-emitting elements. By using a plurality of light-emitting elements, light emission luminance per pixel can be improved.

The light emission color of the light-emitting element 11 can be controlled in accordance with a drive current thereof. As such a light-emitting element 11, a multicolor light-emitting wavelength-tunable LED can be suitably used. The light emission color of the light-emitting element 11 is changeable from blue to red, for example.

Lighting Controller 50

The lighting controller 50 supplies a drive current to each of the plurality of light-emitting elements 11 to control a light emission period. In the example illustrated in the enlarged view of FIG. 1, the lighting controllers 50 are connected to a power supply line 9 and a write scanning line WS extending in a horizontal direction. The lighting controller 50 is driven by power supplied from the power supply line 9, and is scanned by the write scanning line WS to receive a power supply control signal and an analog image signal. On the other hand, the lighting controller 50 is also connected to a signal line SL extending in a vertical direction, and receives the power supply control signal and the analog image signal via the signal line SL.

The lighting controller 50 divides one frame to drive the plurality of light-emitting elements 11 to emit light into a first subframe to drive each of the plurality of light-emitting elements 11 to emit light in the first light emission color and a second subframe to drive each of the plurality of light-emitting elements 11 to emit light in the second light emission color, and drives the plurality of light-emitting elements 11. For example, the first subframe is a B subframe for emitting blue light, and the second subframe is an RG subframe for emitting green light to red light.

In this way, the second light emission color of the second subframe has a variable wavelength, while the first light emission color of the first subframe has a fixed wavelength, and lighting of the light-emitting element 11 is controlled. Thus, the light-emitting device 100 with a tunable light emission color can be efficiently driven. In particular, by limiting the light emission control of the light-emitting elements 11 that can emit light of different light emission colors in accordance with a drive current to light emission control that is variable only in a limited range of wavelengths, for example, from green light to red light without controlling light emission in the entire range of RGB, full-color light emission for each pixel can be achieved in combination with the first light emission color by a fixed wavelength, and simpler light emission control can be implemented. In addition, because full-color image display can be implemented without using three sub-fields of RGB as in a generally known display, pixels can be driven more easily and with lower power consumption.

In a multicolor light-emitting type LED having a tunable light emission wavelength, a light emission color is changed by a drive current. In other words, because the amount of drive current varies greatly depending on the light emission color, light emission luminance also varies greatly at the same time. For example, when a multicolor light-emitting type LED is used to display light of a short wavelength and light of a long wavelength on one display with luminance and light emission colors appropriately adjusted, a light emission period needs to be controlled in a range of approximately 3 to 30 times depending on the light emission wavelength. Therefore, to obtain sufficient light emission luminance by reducing an unnecessary non-lighting period, field sequential driving is desirably adopted to perform lighting in different subframes for each light emission color.

However, when the field sequential driving for changing the light emission color for each subframe is performed, color separation may occur particularly in a moving image and image quality may be significantly deteriorated. That is, in the field sequential driving, because pixels are of an active matrix type, a certain light emission duration needs to be secured after display data is written into a row selected by scanning. Thus, a scanning period and the light emission period of each of the rows are defined independently. Thus, in the field sequential method, the light emission is performed not on a row-by-row basis but on a sub-field-by-sub-field basis, which causes a problem that color separation occurs as a side effect.

On the other hand, in the light-emitting device 100 according to the first embodiment, color separation is suppressed by using only blue light with low human visibility in another subframe. A detailed description is given below.

Light-Emitting Element 11

As the light-emitting element 11, a semiconductor light-emitting element such as a light-emitting diode (LED) or a semiconductor laser (LD) can be suitably used. As the LED, an LED in which one or more semiconductor layered bodies including light-emitting portions (hereinafter, also simply referred to as the "semiconductor layered body") can be used. The semiconductor layered body has light-emitting characteristics, and such a semiconductor layered body is produced by layering a plurality of semiconductor layers, such as ZnS, SiC, GaN, GaP, InN, AlN, ZnSe, GaAsP, GaAlAs, InGaN, GaAlN, AlInGaP, AlInGaN or the like, on a substrate by liquid phase epitaxy, HVPE, or MOCVD, and forming an active layer on any one of the semiconductor layers. By selecting a material of the semiconductor layer and a mixed crystal ratio thereof, the light emission wavelength of the active layer can be selected variously from ultraviolet light to infrared light. In particular, in a case of a display device that can be suitably used outdoors, a semiconductor layered body that can emit light with high luminance is desired. Therefore, a nitride semiconductor is preferably selected as a material of a light-emitting portion that emits light with high luminance. For example, $In_XAl_YGa_{1-X-Y}N$ ($0 \le X \le 1$, $0 \le Y \le 1$, and $X+Y \le 1$) or the like can be used as the material of the light-emitting portion.

In the first embodiment, a semiconductor light-emitting element such as a light-emitting diode or a semiconductor laser is used as each light-emitting element 11. A micro-LED may also be used as the light-emitting diode. The micro-LED has a chip size of 5 μm to 100 μm, and suitably 10 μm to 50 μm in consideration of light emission efficiency and the like.

The light emission color of the light-emitting element 11 is tunable. The light-emitting element 11 emits light of a different light emission color in accordance with a drive current. For example, when driven by a first drive current, the light-emitting element 11 emits light of a first light emission wavelength, such as red light, for example, when driven by a second drive current larger than the first drive current, the light-emitting element 11 emits light of a second light emission wavelength shorter than the first light emission wavelength, such as greed light, for example, and when driven by a third drive current larger than the second drive current, the light-emitting element 11 emits light of a third light emission wavelength shorter than the second light emission wavelength, such as blue light, for example.

In this way, when the light-emitting element 11 is of a tunable-wavelength type, the wavelength of each light emission color such as blue light can be adjusted. In general, in a blue light-emitting element, a variation in a light emission wavelength is observed between elements to be manufactured, but the variation in the light emission wavelength of the light-emitting element between pixels, for example, can be corrected and the wavelengths of blue light and the like of each pixel can be made the same.

Each of the light-emitting elements 11 is connected to a plurality of common lines and a plurality of drive lines. The light-emitting elements 11 are connected to one of the plurality of common lines and one of the plurality of drive lines and arranged in a matrix to constitute the display 10.

Scanning Circuitry 20

Figure 4:
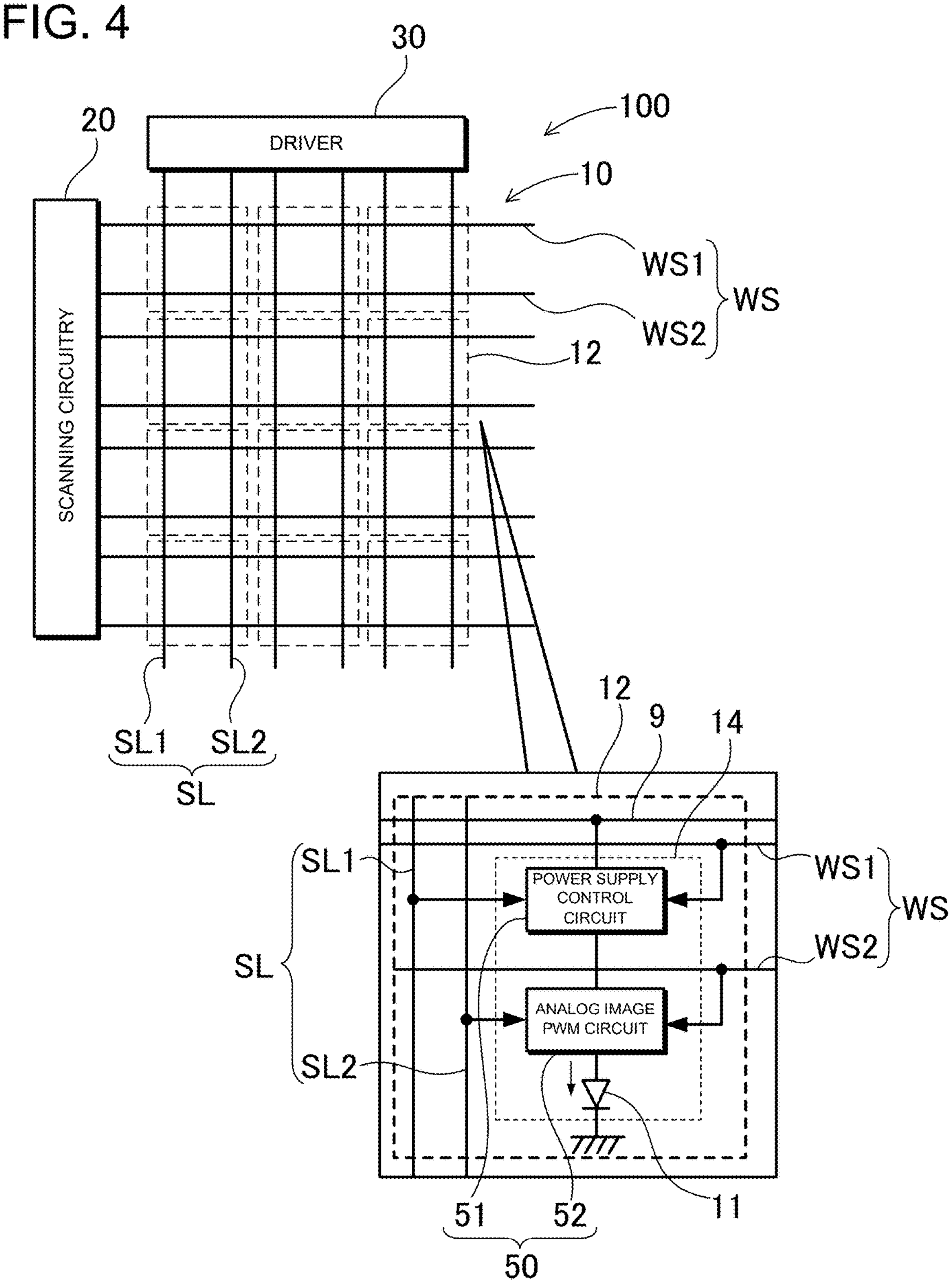
FIG. 4 is a block diagram with an enlarged view illustrating of a display of the light-emitting device according to the first embodiment.

The scanning circuitry 20 is provided in a further left column of the leftmost column of the pixels 12 arranged in a matrix. The scanning circuitry 20 may be provided in a further right column of the rightmost column of the pixels 12 arranged in a matrix. As illustrated in FIG. 4, a power supply control signal write scanning line WS1 and an analog image signal write scanning line WS2 are provided for each row of the pixels as write scanning lines WS extending from the scanning circuitry 20. The power supply control signal write scanning line WS1 and the analog image signal write scanning line WS2 extend in the row direction.

The power supply control signal write scanning line WS1 supplies a first scanning signal being a digital signal for selecting, in the row direction, a pixel circuit 14 (the lighting controller 50 and the light-emitting element 11 in FIG. 1) when desired voltage values are written, by the power supply control signal. The analog image signal write scanning line WS2 supplies a second scanning signal being a digital signal for selecting the pixel circuit 14 in the row direction when a light emission period determined by a light emission tone is written as a voltage value by an analog image signal.

Driver 30

The driver 30, as illustrated in FIG. 4, has a power supply control signal line SL1 and an analog image signal line SL2 extending as the signal lines SL in the vertical direction for each column of the pixels. The driver 30 supplies a power supply control signal to each pixel circuit 14 via the power supply control signal line SL1. The power supply control signal is an analog signal that can take a plurality of voltage values. The driver 30 supplies an analog image signal to each pixel circuit 14 via the analog image signal line SL2. The analog image signal is also an analog signal that can take a plurality of voltage values. Each pixel circuit 14, to which the power supply control signal is supplied and the voltage value is written, sets a drive current based on the written voltage value. Each pixel circuit 14, to which the analog image signal is supplied and the voltage value is written, sets a threshold voltage to be compared with a reference triangular wave signal based on the voltage value of the analog image signal, and sets a time width during which the pixel circuit 14 emits light. A reference triangular wave signal (not illustrated) is supplied to the pixel circuit 14 during a light emission period, and the light-emitting element 11 of each pixel circuit 14 emits light during an ON period based on a written analog image signal voltage. The drive current value at which the light-emitting element 11 emits light is set by the power supply control signal voltage (for details, refer to U.S. patent Ser. No. 10/885,834).

The driver 30 may generate the reference triangular wave signal to be supplied to each pixel circuit 14 for each column. Alternatively, the reference triangular wave signal may be separately provided as a reference triangular wave circuit in a row lower than the lowermost row of the matrix of the pixel circuits 14. The driver 30 or the reference triangular wave circuit distributes, for example, a reference triangular wave supplied from the outside of these circuits to the columns of the pixel circuits 14.

The driver 30 may include a storage unit. The storage unit can store luminance settings for a plurality of voltage values taken by the power supply control signal and luminance settings for a plurality of voltage values taken by the analog image signal. The relationship between the voltage values and the luminance settings can be adjusted and set by visually checking the luminance of the light-emitting element 11 constituting the pixel circuit 14. The γ correction can be performed by appropriately setting the relationship between the voltage values and the luminance settings. While gradation characteristics become linear in a digital PWM system, the fact that the γ correction can be applied to a signal is one of the advantages of this system. The storage unit is formed by, for example, an electrically rewritable storage circuit or the like.

Information Storage 70

As described above, the light-emitting element 11 is a multicolor light-emitting wavelength-tunable LED, and changes the light emission color in accordance with a drive current. Therefore, a drive current value for driving the light-emitting element 11 needs to be determined in accordance with a light emission color to be emitted by the light-emitting element 11. Therefore, the information storage 70 stores current-chromaticity information indicating the light emission color to be emitted by the light-emitting element 11 and a correspondence relationship that determines a current value for emitting this color. The drive controller 60 determines a drive current of the light-emitting element 11 corresponding to the light emission color by referring to the information stored by the information storage 70. The information storage 70 may include, for example, a storage element such as a current-chromaticity data memory for storing current-chromaticity data of the light-emitting element 11.

The information storage 70 may also store current-chromaticity information based on an actually measured value of each light-emitting element arranged in the display, and store current-chromaticity information generated by measuring a drive current and a light emission color of a light-emitting element equivalent to each light-emitting element arranged in the display. Alternatively, the information storage 70 may store current-chromaticity information that is recorded by statistically determining the relationship between the drive current and the light emission color of the light-emitting element. In the example of FIG. 1, the information storage 70 has a light emission chromaticity-drive current-luminance characteristic table of (G-R). Here, (G-R) means a wavelength range from green light to red light.

Drive Controller 60

Figure 3:
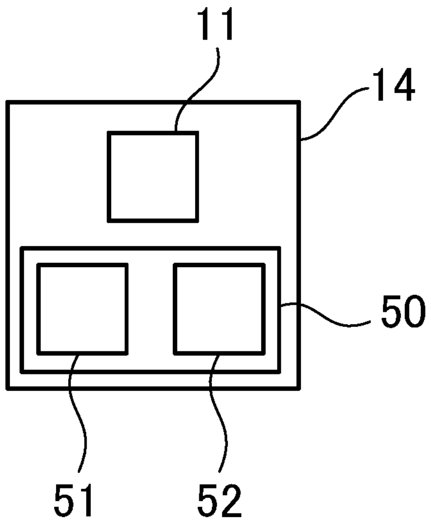
FIG. 3 is a block diagram illustrating an example in which a first control circuit and a second control circuit are provided in a pixel circuit.

The drive controller 60 further controls the operations of the scanning circuitry 20 and the driver 30. The scanning circuitry 20 and the driver 30 control the lighting controller 50 of each pixel. As illustrated in FIG. 3, each lighting controller 50 can include a first control circuit 51 and a second control circuit 52. The first control circuit 51 supplies a drive current to each of the light-emitting elements 11. The second control circuit 52 controls the light emission period of each of the light-emitting elements 11. A configuration in which the light-emitting element 11 is connected to the lighting controller 50 may be referred to as the "pixel circuit 14." The first control circuit 51 is connected between the power supply line 9 and the second control circuit 52.

The drive controller 60 controls the driver 30 to supply the drive current to each of the light-emitting elements 11 so that each of the light-emitting elements 11 emits light of a specific light emission color and light emission luminance. Specifically, the drive controller 60 determines the drive current value for driving each of the light-emitting elements 11 and an ON period for lighting each of the light-emitting elements 11, by referring to the current-chromaticity information stored in the information storage 70 in accordance with a specific light emission color and gradation information for each of the light-emitting elements 11, and performs the lighting driving of each of the light-emitting elements 11 by using the drive current from the lighting controller 50.

The drive controller 60 also performs gradation control of the light emission luminance. For example, the drive current value of each of the light-emitting elements 11 is determined by referring to the current-chromaticity information in accordance with the specific light emission color of each of the light-emitting elements 11, and the ON period of each of the light-emitting elements 11 is determined in accordance with the determined drive current value and with the specific gradation information for each of the light-emitting elements 11.

The drive controller 60 may include a storage unit. The storage unit can store luminance settings for a plurality of voltage values taken by the power supply control signal and luminance settings for a plurality of voltage values taken by the analog image signal. The relationship between the voltage values and the luminance settings can be adjusted and set by visually checking the luminance of the light-emitting element 11 constituting the pixel circuit 14. The γ correction can be performed by appropriately setting the relationship between the voltage values and the luminance settings. While gradation characteristics become linear in a digital PWM system, the fact that the γ correction can be applied to a signal is one of the advantages of this system. The storage unit is formed by, for example, an electrically rewritable storage circuit or the like.

The drive controller 60 may further cause the driver 30 to simultaneously perform lighting control of each of the light-emitting elements 11 in a state in which ON period information corresponding to the one screen of each of the light-emitting elements 11 constituting the display 10 is written into the storage unit.

The drive controller 60 determines a drive current value for driving each of the light-emitting elements 11 and a light emission period for emitting light by referring to the current-chromaticity information stored in the information storage 70, in accordance with the light emission color and the gradation information for each of the light-emitting elements 11 that are imparted from the outside. Subsequently, the drive controller 60 drives each of the light-emitting elements 11 to light using the lighting controller 50 via the driver 30. With such a configuration, the lighting control of the display 10 constituted by the light-emitting elements 11 of the multicolor light-emitting type can be realized.

With respect to the light emission color of the light-emitting element 11, when drive current values for emitting respective light emission colors of, for example, red (R), green (G), and blue (B) are IR, IG, and IB, respectively, the magnitude of the drive current values satisfies IR<IG<IB. Therefore, when the light emission periods of the maximum gradation of the respective colors are TR, TG, and TB, the relationship between the lengths of the maximum light emission periods of the respective colors during white display corresponding to full lighting satisfies TR>TG>TB.

In addition, by assigning, to each subframe, the light emission color to be emitted by the light-emitting element 11, the problem of color separation occurring when performing field sequential driving of changing a light emission color for each subframe can be solved. That is, one frame is divided into two subframes, and light emission colors are assigned to the subframes so that the light-emitting element 11 emits light of the first light emission color in the first subframe and emits light of the second light emission color in the second subframe. It is considered that the first light emission color is blue, the second light emission color is any color from green to red, the first subframe is the B subframe, the second subframe is the GR subframe that is tunable between (G-R), and one frame is divided into two subframes to be driven. Because the time resolution of the human eye is low with respect to blue light, even though the blue light is allocated to another subframe and field sequential driving is performed, color separation is hardly recognized. As a consequence, the occurrence of color separation can be avoided, an unnecessary non-lighting period can be reduced while using a multicolor light-emitting type LED, and sufficient light emission luminance can be obtained.

Accordingly, in the light-emitting device 100 according to the first embodiment, the light-emitting element 11 of a multicolor light-emitting type is used to emit blue light of the first light emission color in the first subframe and to emit light of any color from red to green (G-R) being the second light emission color in the second subframe. Thus, full-color light emission can be implemented without causing color separation. PWM can be used for the gradation control of each of the light emission colors. Here, products of the maximum light emission periods and the drive current values by the PWM driving satisfy R>G>B. This is because light emission luminance efficiency of the light-emitting element 11 is higher in the order of R<G<B.

In this way, full-color light emission can be implemented by using the same light-emitting element 11 to emit light of the first light emission color and the second light emission color. With this configuration, the configuration can be simplified and power consumption can be reduced as compared with a configuration in which light-emitting elements that emit light of different colors are arranged in respective pixels. Because a single light-emitting element is used for each pixel, an LED element having a larger chip size can be used, but when the chip size of the LED element is larger, the proportion of a recombination current generated at the end face of a light-emitting layer decreases, and thus the light-emitting efficiency is improved.

In the above description, the light emission color of the light-emitting element 11 is tunable in the entire range of R, G, and B on the premise of full-color light emission; however, the present disclosure is not limited to a light-emitting device that emits full-color light. For example, the present disclosure can also be applied to a light-emitting device that emits light in a range of two colors of green and blue or two colors of red and green. In this case, by manufacturing the light-emitting element in accordance with a required light emission color, for example, by manufacturing the light-emitting element so that the light emission color of the light-emitting element can be changed only in the range from R to G, advantages such as simplification of a manufacturing process and cost reduction can be obtained. For example, the manufacturing process margin of the light-emitting element 11 can be made wider.

Timing Chart

Figure 2:
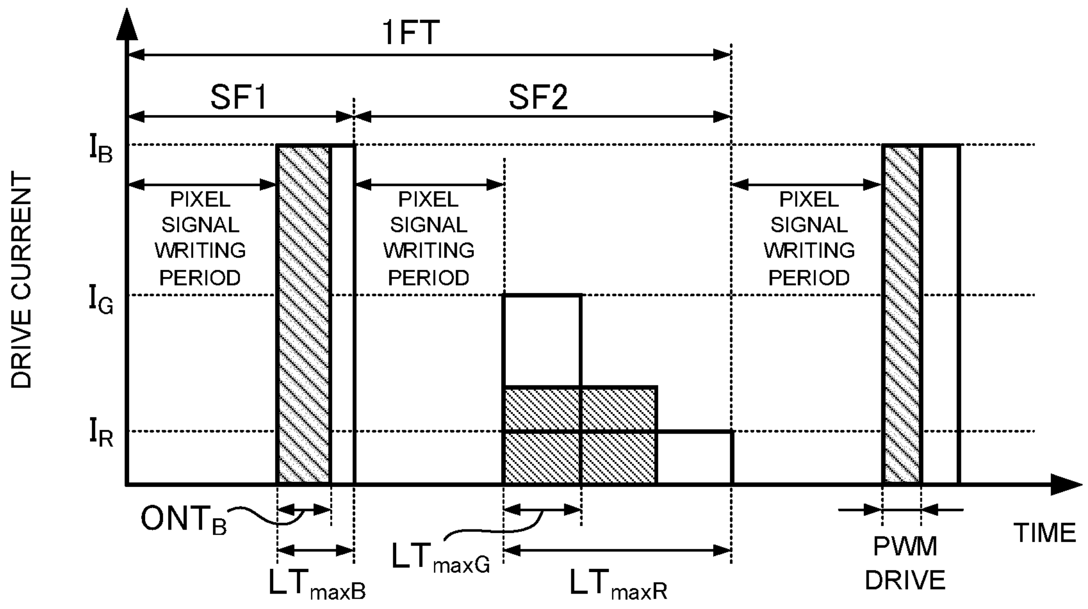
FIG. 2 is a timing chart for lighting and driving a light-emitting element.

FIG. 2 is a timing chart showing lighting timings of each of the RGB colors of the light-emitting device 100 illustrated in FIG. 1. One frame period FT is divided into a first subframe period SF1 in which the light-emitting element 11 emits light of the first light emission color and a second subframe period SF2 in which the light-emitting element 11 emits light of the second light emission color. The first subframe period SF1 is the B subframe in which blue light is emitted, and the second subframe period SF2 is the GR subframe in which light of any color from green to red is emitted. In the B subframe, a current having a value for emitting a light emission color corresponding to blue light, for example, 470 nm, is supplied to the light-emitting element 11. In the GR subframe, because light is changed from green light to red light, a current having a value in a range from a current value for emitting a light emission color corresponding to green light, for example, 515 nm to a current value for emitting a light emission color corresponding to red light, for example, 630 nm is supplied to the light-emitting element 11. That is, a current having a value to drive the light-emitting elements 11 to emit blue light is supplied in the B subframe, whereas a drive current corresponding to any color from green to red is supplied in the GR subframe. In this way, in each subframe, the light emission color is controlled by the vertical axis (drive current) in FIG. 2.

In each subframe, the light emission luminance is controlled by PWM control. By changing an ON period ONT within a maximum light emission period LTmax, the luminance can be adjusted to a desired value by changing a current integrated value while supplying a current at a maximum value. A maximum light emission period of blue light is denoted by LTmaxB, and the ON period of blue light is denoted by ONTB. On the other hand, in a maximum light emission period from green light to red light, the maximum light emission period of green light is denoted by LTmaxG and the maximum light emission period of red light is denoted by LTmaxR. The ON period ONT is included in the maximum light emission period. Actually, as shown by oblique lines in FIG. 2, once the drive current value (vertical axis) is determined in accordance with a desired light emission color, the horizontal axis is determined in accordance with the luminance. In this way, in both the B subframe and the (G-R) subframe, luminance control is performed by the horizontal axis (ON period) in FIG. 2.

A pixel signal writing period is provided in each subframe, and PWM control is performed after the pixel signal writing period. In the pixel signal writing period, a pixel signal for one screen of the light-emitting element 11 are written to a pixel memory. The driver 30 controls lighting of the light-emitting element 11 by referring to the pixel signal written to the pixel memory. The pixel memory is provided in the lighting controller 50 of the pixel circuit 14.

As illustrated in FIG. 3, the lighting controller 50 includes the first control circuit 51 and the second control circuit 52. The first control circuit 51 performs current driving in accordance with a light emission color. The second control circuit 52 performs PWM control. Specifically, in performing the PWM control, the second control circuit 52 sets a time width for supplying a current to the light-emitting element 11 based on the result of comparison between a first signal including a triangular wave signal and a first DC voltage set in a predetermined period. Based on a second DC voltage set in a period different from the predetermined period, the first control circuit 51 controls a current value to be supplied by the lighting controller 50.

As illustrated in FIG. 4, the power supply control signal write scanning line WS1 and the analog image signal write scanning line WS2 extend from the scanning circuitry 20, and are connected to each pixel 12. The power supply control signal line SL1 and the analog image signal line SL2 extend from the driver 30, and are connected to each pixel 12. The driver 30 is a driver IC that processes a power supply control signal and an analog image signal. The power supply control signal write scanning line WS1 and the analog image signal write scanning line WS2 are connected to a TFT circuit provided on a mounting substrate together with the pixel circuit 14. The TFT is made of low-temperature polycrystalline Si or an oxide semiconductor.

Each pixel 12 includes the lighting controller 50 and the light-emitting element 11 as illustrated in an enlarged view of main components of FIG. 4. Each pixel circuit 14 includes the lighting controller 50. The lighting controller 50 includes a first control circuit 51 and a second control circuit 52. The first control circuit 51 supplies a drive current to the light-emitting element 11. On the other hand, the second control circuit 52 controls the light emission period of the light-emitting element 11. The first control circuit 51 is a power supply control circuit and the second control circuit 52 is an analog image PWM circuit. The first control circuit (power supply control circuit) 51 is connected to the power supply line 9 and the power supply control signal line SL1. A power supply control signal write timing is input from the power supply control signal write scanning line WS1. On the other hand, the second control circuit (analog image PWM circuit) 52 is connected in series to the power supply line 9 via the first control circuit 51. The second control circuit 52 is also connected to the analog image signal line SL2. An analog image signal write timing is input from the analog image signal write scanning line WS2. In this way, each of the light-emitting elements 11 is connected to the power supply line 9 via the power supply control circuit and the analog image PWM circuit. A drive current value is controlled by the power supply control circuit, and a drive time is controlled by the analog image PWM circuit.

FIG. 4 illustrates an example in which each pixel 12 includes one LED; however, the present disclosure is not limited to this configuration and each pixel may include a plurality of light-emitting elements such as LEDs. For example, when a plurality of light-emitting elements are used for the purpose of increasing luminance or the like, two or more light-emitting elements may be connected in series or in parallel.

LED

Figure 5:
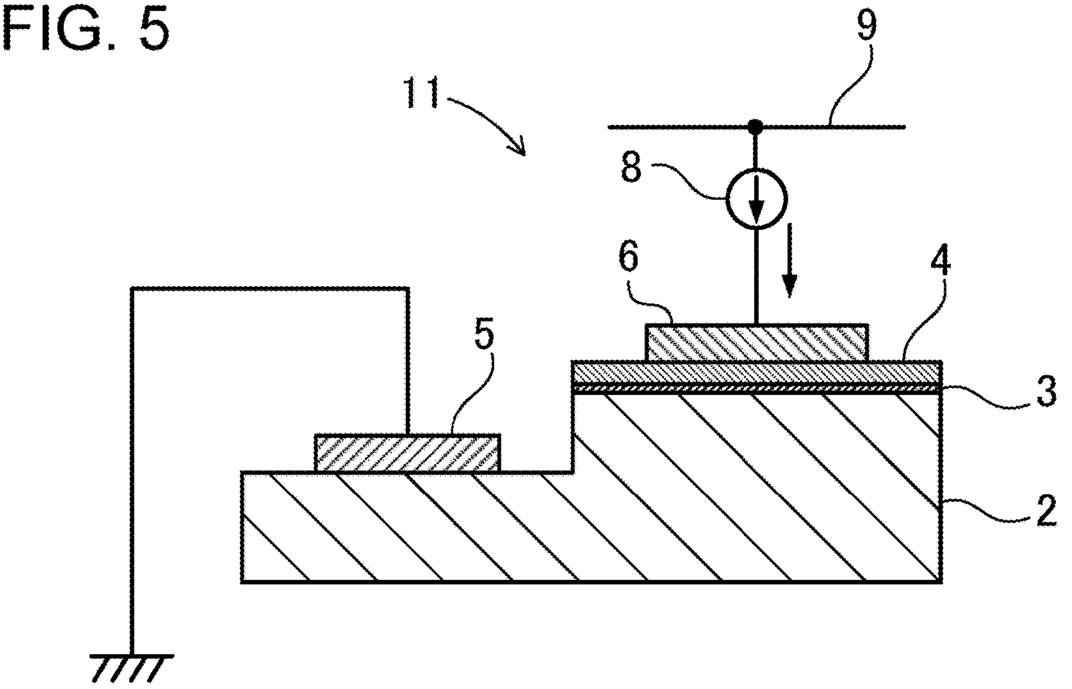
FIG. 5 is a schematic cross-sectional view illustrating an example of an element structure of a light-emitting element.

FIG. 5 illustrates an example of an element structure in the case of using an LED as the light-emitting element 11. The light-emitting element 11 illustrated in FIG. 5 includes an n-type semiconductor layer 2, an active layer 3, a p-type semiconductor layer 4, an n-side electrode 5, and a p-side electrode 6. The active layer 3 may have a multiple quantum well structure (MQW) or the like. The light-emitting element 11 is connected to a pixel drive circuit 8 such as a DC power supply, and emits light upon receiving a drive current supplied from the power supply line 9. The light emission color of the light-emitting element 11 is controlled by the drive current, and the light emission period of the light-emitting element 11 is controlled by the drive current. The light emission color is tunable to any color from blue to red.

The light-emitting element may include a first light-emitting portion that emits light of a first light emission color and a second light-emitting portion that emits light of a second light emission color, and light emission of the first light-emitting portion and light emission of the second light-emitting portion may be selectable by a switch. With such a configuration, by limiting the light emission control of the light-emitting elements that can emit light of different light emission colors in accordance with a drive current to light emission control that is tunable only in a limited range of wavelengths, for example, from green light to red light without controlling light emission in the entire range of RGB, simpler light emission control can be implemented. For example, the first light-emitting portion can be a B light-emitting layer that emits blue light, and the second light-emitting portion can be an RG light-emitting layer that emits any color from red to green. Thus, the RG light-emitting layer is combined with the B light-emitting layer, which emits blue light to enable full-color light emission for each pixel.

Figure 6:
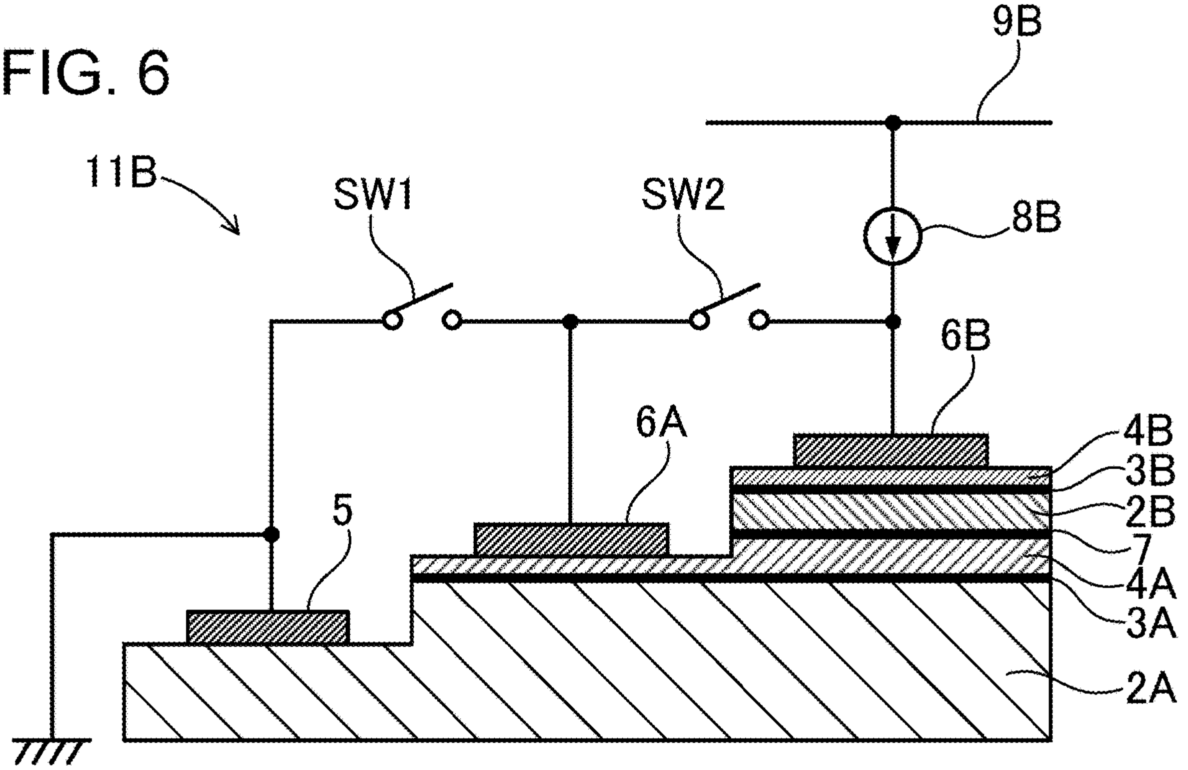
FIG. 6 is a schematic cross-sectional view illustrating another example of an element structure of a light-emitting element.

An example of such a light-emitting element is illustrated in FIG. 6. A light-emitting element 11B illustrated in FIG. 6 includes a first n-type semiconductor layer 2A, a first light-emitting layer 3A, a first p-type semiconductor layer 4A, an ohmic junction layer 7, a second n-type semiconductor layer 2B, a second light-emitting layer 3B, a second p-type semiconductor layer 4B, an n-side electrode 5, a first p-side electrode 6A, and a second p-side electrode 6B. An active layer such as a multiple quantum well structure (MQW) can be used for the first light-emitting layer 3A and the second light-emitting layer 3B. As the ohmic junction layer 7, an intervening layer that implements ohmic junction between the first p-type semiconductor layer 4A and the second n-type semiconductor layer 2B can be used. Although FIG. 6 illustrates an example in which the first p-side electrode 6A is used, the second n-type semiconductor layer 2B may be used as the n-side electrode instead of the first p-type semiconductor layer 4A. Normally, the second n-type semiconductor layer 2B having a low resistance value can be easily formed thicker than the first p-type semiconductor layer 4A having a high resistance value. Therefore, this case has an advantage that the processing yield at the time of forming chip electrodes is easily improved.

The light-emitting element 11B is connected to a pixel drive circuit 8B such as the lighting controller 50, and emits light upon receiving a drive current supplied from a power supply line 9B. A light emission color of the light-emitting element 11B is controlled by the drive current, and a light emission period of the light-emitting element 11 is controlled by the drive current. In the example of FIG. 6, a first light emission color of the first light-emitting layer 3A is blue, and a second light emission color of the second light-emitting layer 3B is tunable to any color from red to green.

Such a tandem structure in which the first light-emitting layer 3A and the second light-emitting layer 3B are stacked can be formed on the same growth substrate by successive epitaxial growth steps. For example, a GaN crystal constituting a semiconductor layer is formed on a wafer of a sapphire substrate as a growth substrate, and then the first light-emitting layer 3A is epitaxially grown first, and subsequently the second light-emitting layer 3B is grown. Here, by forming the first light-emitting layer 3A that emits blue light before the second light-emitting layer 3B is formed, an advantage is obtained in that defects of the GaN crystal are less likely to occur. Subsequently, the structure is processed into an LED element shape and the n-side electrode 5, the first p-side electrode 6A, and the second p-side electrode 6B are formed. Moreover, the sapphire substrate is peeled off from the structure and the structure is divided into individual elements. In addition, by roughening the light-emitting surface side of the first n-type semiconductor layer 2A, the light extraction efficiency can be improved. In this way, the light-emitting element 11B having the tandem structure in which the first light-emitting layer 3A and the second light-emitting layer 3B are stacked is obtained, and the control of a light emission color of the light-emitting layer is not limited to the entire range of RGB but limited to a specific range of wavelengths from green light to red light, so that the emission control can be simplified.

The first light-emitting layer 3A and the second light-emitting layer 3B may be connected in series. In addition, a first switch SW1 and a second switch SW2 may be provided at an intermediate point of the series connection between the first light-emitting layer 3A and the second light-emitting layer 3B. The first switch SW1 is connected in parallel with the first light-emitting layer 3A. The second switch SW2 is connected in parallel with the second light-emitting layer 3B.

The light-emitting element 11B turns off the first switch SW1 and turns on the second switch SW2 when the first light-emitting layer 3A emits light. On the other hand, when the second light-emitting layer 3B emits light, the light-emitting element 11B turns on the first switch SW1 and turns off the second switch SW2. Any of the first light-emitting layer 3A and the second light-emitting layer 3B can also be first turned on. That is, blue light from the first light-emitting layer 3A may be first turned on in the first subframe, and red to green light may be emitted from the second light-emitting layer 3B in the subsequent second subframe. However, when red to green light is first turned on from the second light-emitting layer 3B, because the delay of the blue light is hardly recognized by the human eye, the image delay with respect to an input signal is advantageously reduced.

B Subframe

Figure 7:
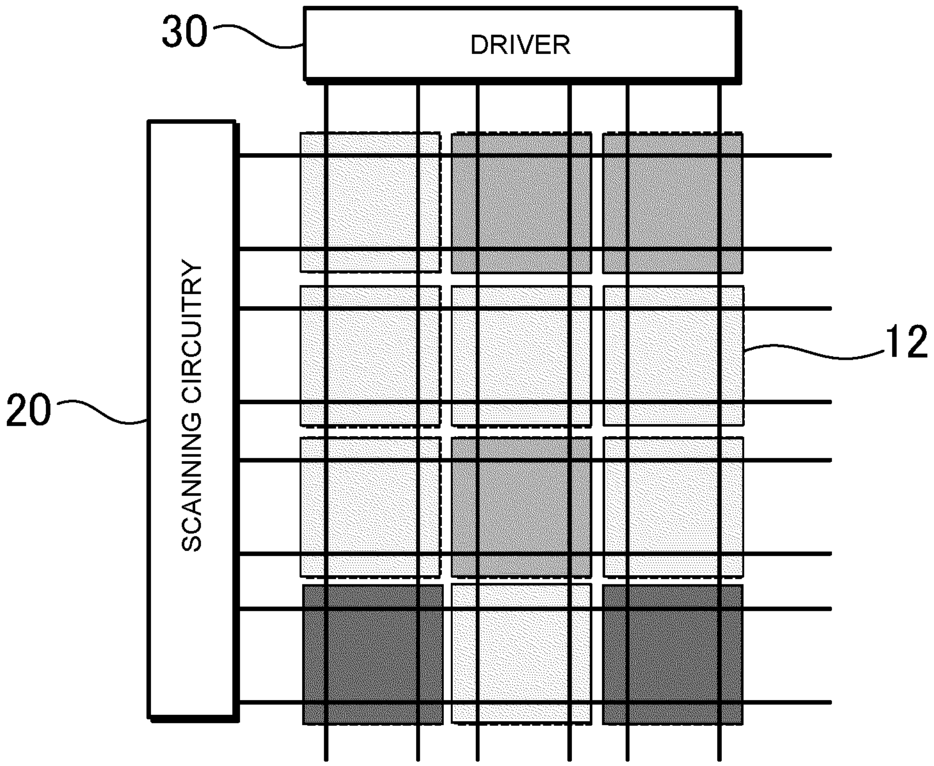
FIG. 7 is a schematic diagram illustrating a lighting image in a first subframe.
Figure 8:
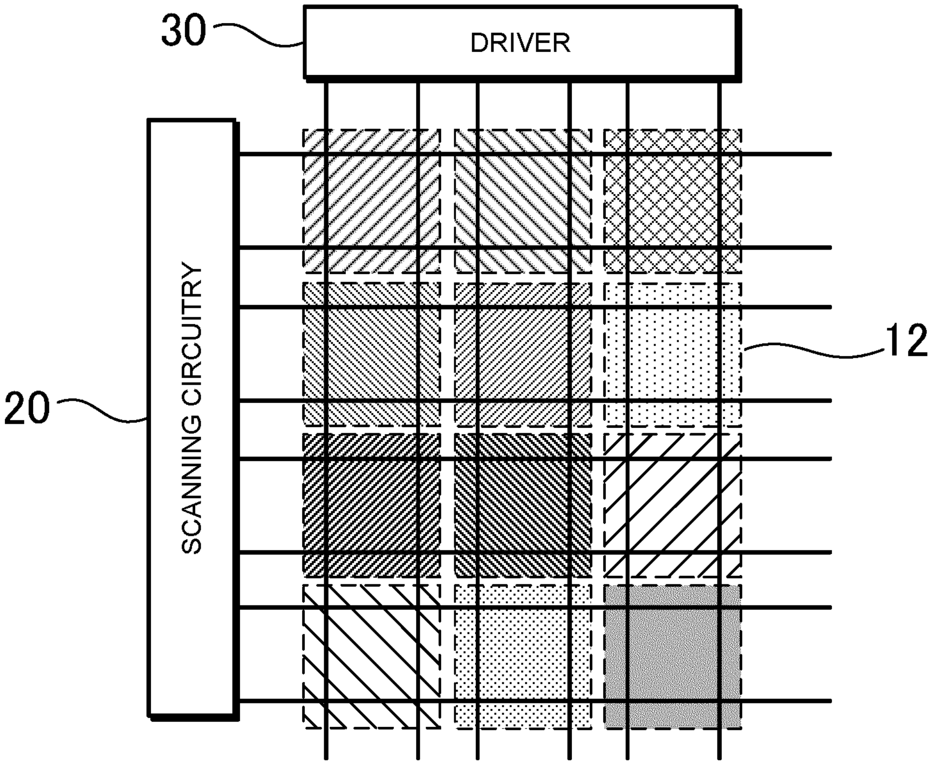
FIG. 8 is a schematic diagram illustrating a lighting image in a second subframe.

FIG. 7 illustrates a lighting image in the B subframe using such a display 10 and FIG. 8 illustrates a lighting image in the GR subframe using such a display 10. In these drawings, each pixel 12 is illustrated in a tile shape. In the B subframe, the luminance is different between the pixels 12, but the chromaticity is constant. The luminance gradation is controlled by PWM. The difference in the density of each pixel 12 in FIG. 7 represents the difference in the average luminance in the subframe.

GR Subframe

On the other hand, in the GR subframe, both the luminance and the chromaticity are tunable between the pixels 12. In the (G-R) subframe, the current value supplied to the light-emitting element 11 and the second light emission color, that is, the chromaticity, are controlled in the range of (G-R). Specifically, in each pixel 12, the lighting controller 50 acquires the RGB chromaticity by referring to the information storage 70. When the chromaticity of B, that is, the first light emission color to be emitted by the light-emitting element 11 is fixed wavelength light emission, a drive current value is uniquely determined. On the other hand, the second light emission color that causes the light-emitting element 11 to emit a tunable wavelength light needs to be determined. First, a light emission color at the time of (G-R) wavelength variation and a luminance ratio of B to (G-R) are determined from a chromaticity signal to be displayed so as to correspond to a color at the time of B emission. Subsequently, a light emission intensity corresponding to a luminance signal to be displayed is determined from the chromaticity of the light emission color and the luminance ratio.

Method for Driving Light-Emitting Device

An example of a method for driving the light-emitting device 100 is described below. The following describes a process in which the lighting controller 50 divides one frame to drive the light-emitting element 11 to emit light into a first subframe and a second subframe and drives the light-emitting element 11. In the first subframe, each of the plurality of light-emitting elements 11 is caused to emit light of the first light emission color. Because blue light is emitted as the first light emission color in the first subframe, it is referred to as the B subframe. In the second subframe, each of the plurality of light-emitting elements 11 is caused to emit light of the second light emission color. Because light is emitted in the range from red light to green light in the second subframe, it is referred to as the RG subframe.

The lighting controller 50 causes the first control circuit 51 to supply a drive current to each of the light-emitting elements 11, and causes the second control circuit 52 to control a light emission period of each of the light-emitting elements 11. The step of driving the light-emitting element 11 by the lighting controller 50 includes a step of determining a chromaticity of the second light emission color and a luminance ratio of the luminance of the light-emitting element 11 that emits light of the first light emission color and the luminance of the light-emitting element 11 that emits light of the second light emission color from a chromaticity signal and a luminance signal to be displayed by each pixel 12 so as to correspond to the first light emission color, a step of determining a light emission intensity corresponding to a luminance signal to be displayed by the light-emitting element 11 based on the chromaticity of the second light emission color and the luminance ratio, a step of supplying, by the first control circuit 51, a drive current having a value corresponding to a light emission color of each of the light-emitting elements 11 to the corresponding one of the light-emitting elements 11 by referring to the information storage 70, and a step of controlling, by the second control circuit 52, the light emission period of the drive current supplied to each of the light-emitting elements 11 by the first control circuit 51, in accordance with the determined light emission intensity.

In the first subframe, the first control circuit 51 controls the drive current of each of the plurality of light-emitting elements 11 for emitting light of the first light emission color to be constant, and the second control circuit 52 controls the light emission intensity by PWM control. The drive current of the light-emitting element 11 is set to a drive current value at which blue light emission is highly efficient. For example, it is a rated current value.

On the other hand, in the second subframe, the first control circuit 51 controls a light emission color by a current value for driving each of the plurality of light-emitting elements 11. The second control circuit 52 controls the light emission period of the current value of each of the plurality of light-emitting elements 11 controlled by first control circuit 51, thereby controlling the luminance. Specifically, the second control circuit 52 determines the chromaticity of the second light emission color and the luminance ratio of the light-emitting element 11 that emits light of the first light emission color and the light-emitting element 11 that emits light of the second light emission color from the chromaticity signal and the luminance signal to be displayed by each pixel 12 so as to correspond to the first light emission color. Subsequently, the second control circuit 52 determines the light emission intensity corresponding to the luminance signal to be displayed by the light-emitting element 11 that emits light of the second light emission color, based on the chromaticity of the second light emission color and the luminance ratio. In response to this, the first control circuit 51 supplies a drive current having a value corresponding to the light emission color of each of the light-emitting elements 11 to the corresponding one of the light-emitting elements 11 by referring to the information storage 70. The second control circuit 52 further controls the light emission period of each of the light-emitting elements 11 in accordance with the determined light emission intensity.

Method for Determining Drive Current Value and PWM Light Emission Period

Figure 9:
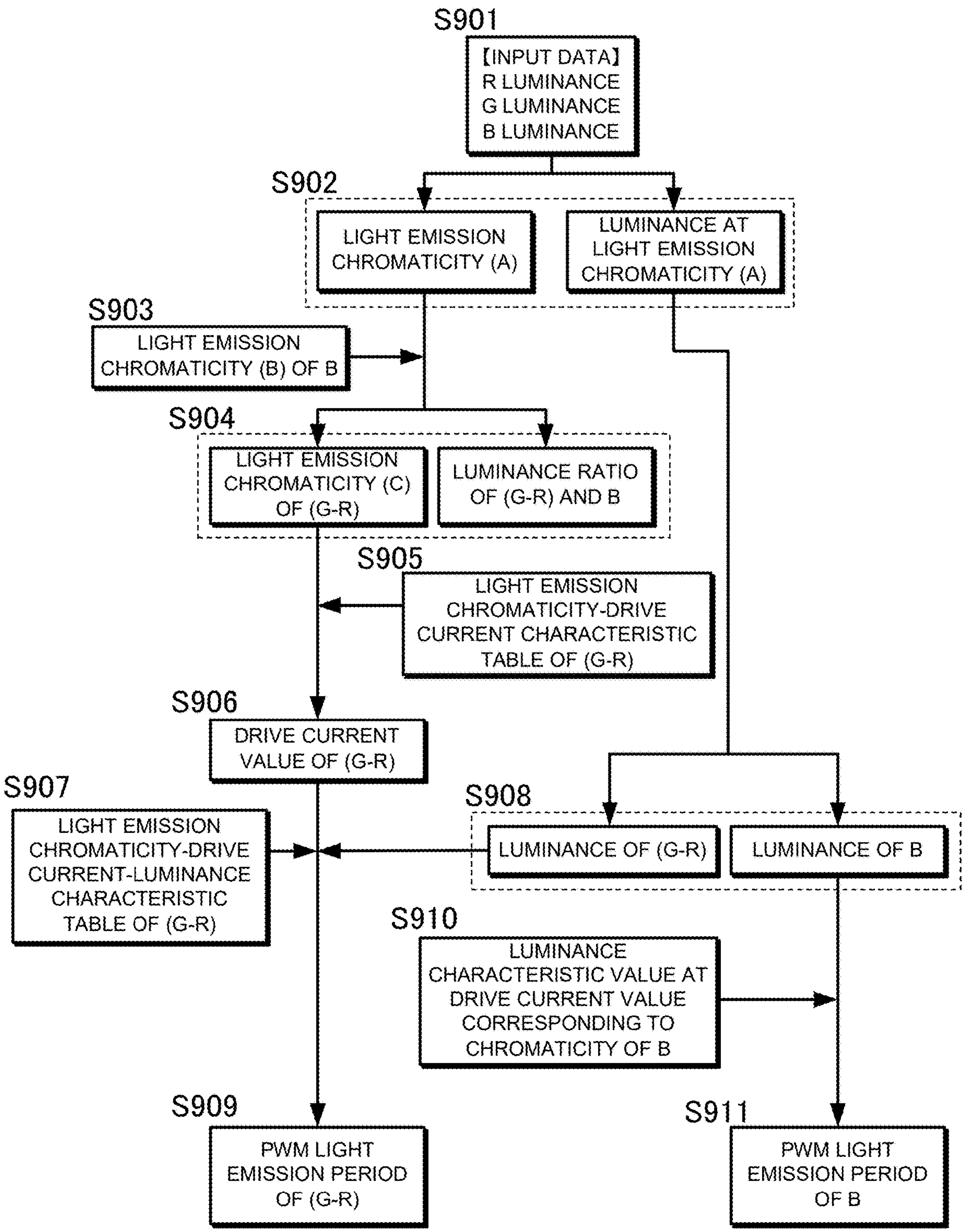
FIG. 9 is a functional block diagram illustrating a method for determining a drive current value and a PWM light emission period.
Figure 10:
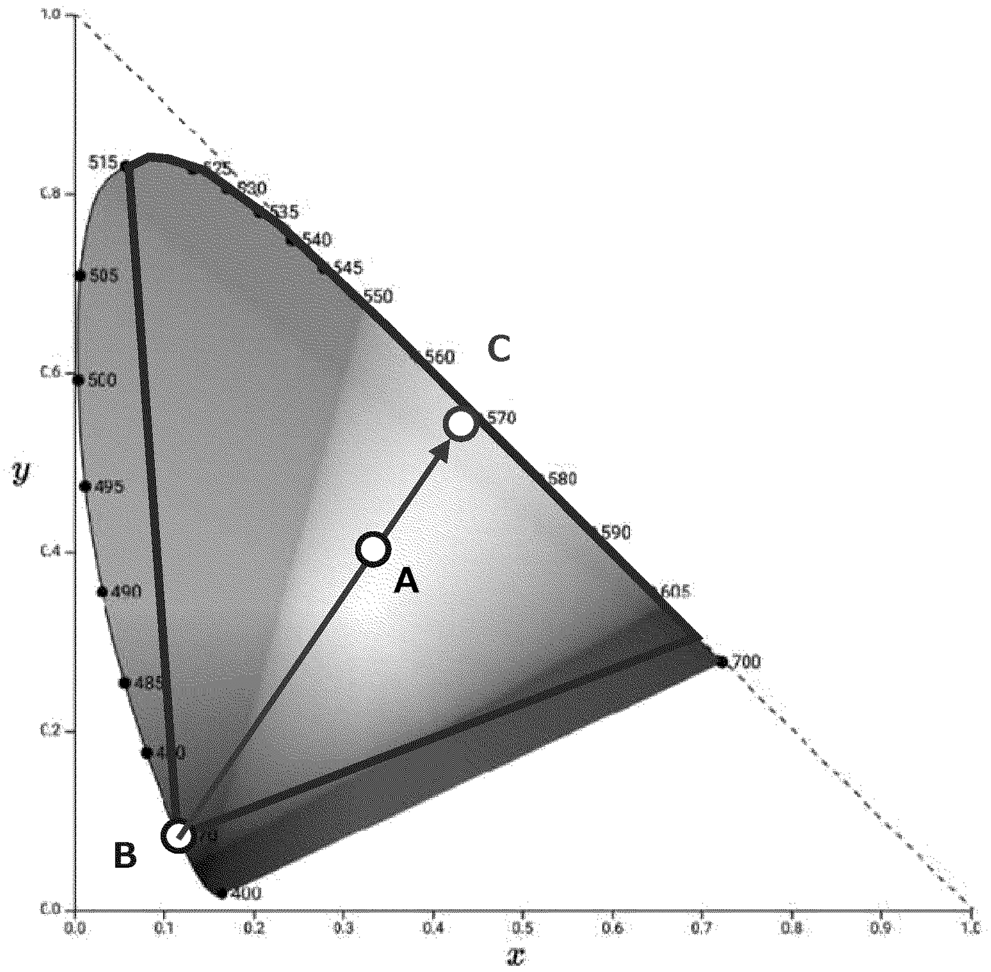
FIG. 10 is a chromaticity diagram for illustrating a procedure for determining a light emission chromaticity in FIG. 9.

Details of the procedure for determining the drive current value and the PWM light emission period of each of the light-emitting elements 11 are described with reference to the functional block diagram of FIG. 9 and the chromaticity diagram of FIG. 10.

First, in step S901, the drive controller 60 acquires image data from an external source. The input data includes R luminance, G luminance, and B luminance.

Subsequently, in step S902, a specific light emission chromaticity and luminance are determined for each pixel. Any light emission chromaticity to be emitted is represented by a point A on the chromaticity diagram of FIG. 10. In this chromaticity diagram, because the light-emitting element 11 emits light of blue as the first light emission color, it is fixed at a point B near the lower left apex of the chromaticity diagram. On the other hand, because the same light-emitting element 11 is caused to emit, in a subframe different from the first light emission color, light of any color from green to red as the second light emission color, the second light emission color is represented on the chromaticity diagram at a point C between green near the upper apex and red near the right apex of the chromaticity diagram. Accordingly, the chromaticity at the point A expressed by the mixed light of the light-emitting element 11 that emits light of the first light emission color and the light-emitting element 11 that emits light of the second light emission color can be expressed by the points B and C. In other words, the second light emission color of the light-emitting element 11 is adjusted to adjust the point C to express the chromaticity at the point A. Moreover, the luminance ratio of B:(G-R) is determined with respect to a predetermined point A in consideration of the balance of the luminance between the light-emitting element 11 that emits light of the first light emission color and the light-emitting element 11 that emits light of the second light emission color. Thus, the drive current value and the light emission period of the light-emitting element 11 that emits light of the second light emission color at the point C are determined.

In accordance with the above-described idea, by considering the light emission chromaticity (B) of B from the light emission chromaticity (A) of A determined in step S902 (step S903), the light emission chromaticity (C) of (G-R) and the luminance ratio of B to (G-R) are determined (step S904). When the luminance ratio of B to (G-R) is determined in step S904, the luminance of (G-R) and the luminance of B are necessarily obtained from the luminance at the light emission chromaticity (A) in step S902 (step S908).

On the other hand, when the light emission chromaticity (C) of (G-R) is determined in step S904, the light emission chromaticity-drive current characteristic table of (G-R) stored in the information storage 70 is referenced (step S905) to determine the drive current value of (G-R) (step S906).

When the drive current value of (G-R) is determined in step S906, the light emission chromaticity-drive current-luminance characteristic table of (G-R) (step S907) stored in the information storage 70 and the luminance of (G-R) (step S908) are referenced to determine the PWM light emission period of (G-R) (step S909).

On the other hand, from the luminance of B obtained in step S908, the PWM light emission period of B is determined with reference to the luminance characteristic value (step S910) at the drive current value corresponding to the chromaticity of B (step S911). In this way, the drive current value of each of the light-emitting elements 11 that emits light of the second light emission color and the PWM light emission periods of the light-emitting element 11 that emits light of the first light emission color and the light-emitting element 11 that emits light of the second light emission color are determined. The drive current value of the light-emitting element 11 that emits light of the first light emission color is a drive current value at which the efficiency of blue light emission is good, for example, a rated current value, or the maximum value of the drive current value that causes the light-emitting element to emit blue light.

In the light-emitting device 100 according to the first embodiment described above, the light-emitting element 11 is provided for each pixel 12. However, a plurality of light-emitting elements may be provided for each pixel. This makes it possible to increase the light emission luminance.

In the first embodiment, the one frame period FT is divided into the first subframe period SF1 in which the light-emitting element 11 emits light of the first light emission color and the second subframe period SF2 in which the light-emitting element 11 emits light of the second light emission color, the first subframe period SF1 is the B subframe in which blue light is emitted, the second subframe period SF2 is the GR subframe in which light of any color from green to red is emitted, and FIG. 2 illustrates a state in which the first subframe period SF1 precedes the second subframe period SF2. However, the present disclosure is not limited to this configuration. For example, the second subframe, which is the GR subframe for emitting light of any color from green to red, may precede the first subframe that is the B subframe for emitting blue light. As described above, the human visual sensitivity perceives brightness in the GR subframe and perceives colors by combining the GR subframe and the B subframe, but it is the timing at which brightness is perceived that has the time resolution. Accordingly, advancing the GR subframe makes it is possible to obtain an effect of suppressing the delay of the timing perceived by a human with respect to video display data input to a display system. In this case, the preceding GR subframe may be rephrased as the first subframe, and the B subframe may be rephrased as the second subframe.

The above examples describe an active matrix driving method, but the present disclosure can also be applied to a passive matrix driving method.

A light-emitting device of the present disclosure can be suitably used for a medium-sized or a large-sized display, an indicator, signage, or the like, for example.

REFERENCE CHARACTERS LIST

100 Light-emitting device
2 n-type semiconductor layer; 2A First n-type semiconductor layer; 2B Second n-type semiconductor layer
3 Active layer; 3A First light-emitting layer; 3B Second light-emitting layer
4 p-type semiconductor layer; 4A First p-type semiconductor layer; 4B Second p-type semiconductor layer
5 n-side electrode
6 p-side electrode; 6A First p-side electrode; 6B Second p-side electrode
7 Ohmic junction layer
8, 8B Pixel drive circuit
9, 9B Power supply line
10 Display
11, 11B Light-emitting element
12 Pixel
14 Pixel circuit
20 Scanning circuitry
30 Driver
50 Lighting controller
51 First control circuit; 52 Second control circuit
60 Drive controller
70 Information storage
WS Write scanning line
WS1 Power supply control signal write scanning line; WS2 Analog image signal write scanning line
SL Signal line; SL1 Power supply control signal line; SL2 Analog image signal line
SW1 First switch
SW2 Second switch

What is claimed is:

1. A light-emitting device comprising:

a display comprising a plurality of pixels in which a plurality of light-emitting elements are arranged in a predetermined pattern, a light emission color of each of the plurality of light-emitting elements being variable in accordance with a drive current;

a lighting controller comprising:

a first control circuit configured to supply a drive current to each of the plurality of light-emitting elements, and a second control circuit configured to control a light emission period of each of the plurality of light-emitting elements; and an information storage configured to store current-chromaticity information for determining a drive current value to drive each light-emitting element to emit light of a first light emission color or a second light emission color in accordance with a specific light emission color of a light-emitting element of the light-emitting elements, wherein the lighting controller is configured to:

divide one frame, in which the lighting controller drives the plurality of light-emitting elements to emit light, into a first subframe and a second subframe, drive at least one of the plurality of light-emitting elements to emit light of the first light emission color in the first subframe, and drive at least one of the plurality of light-emitting elements to emit light of the second light emission color in the second subframe, the second light emission color being different from the first light emission color, wherein the lighting controller is configured to control the plurality of light-emitting elements based on the current-chromaticity information stored in the information storage so that each of the plurality of light-emitting elements emits light of a specific light emission color and light emission luminance, wherein the first control circuit is configured to supply the drive current having a value corresponding to the light emission color of each of the plurality of light-emitting elements to the corresponding one of the plurality of light-emitting elements by referring to the information storage, and wherein the second control circuit is configured to control the light emission period of the drive current supplied to each of the at least one light-emitting element emitting light of the first light emission color and the at least one light-emitting elements emitting light of the second light emission color, in accordance with a light emission intensity corresponding to a luminance signal to be displayed by each of the plurality of light-emitting elements, the light emission intensity being determined based on a chromaticity of the second light emission color and a luminance ratio of luminance of the at least one light-emitting element emitting light of the first light emission color and luminance of the at least one light-emitting element emitting light of the second light emission color, the chromaticity of the second light emission color and the luminance ratio being determined from a chromaticity signal and a luminance signal which are basis of chromaticity and luminance to be displayed by each pixel so as to correspond to the first light emission color respectively, in the second subframe.

2. The light-emitting device according to claim 1, wherein at least one first control circuit and at least one second control circuit are provided for each of the pixels.

3. The light-emitting device according to claim 1, wherein any one of the first light emission color and the second light emission color is blue.

4. The light-emitting device according to claim 1, wherein any one of the first light emission color and the second light emission color is tunable between green and red in accordance with the drive current to each light emitting element.

5. The light-emitting device according to claim 1, wherein:

the lighting controller is configured to set a time width for supplying a current to each of the plurality of light-emitting elements based on comparison between a first signal comprising a triangular wave signal and a first DC voltage set in a predetermined period, and the lighting controller is configured to control the drive current value to be supplied based on a second DC voltage set in a period different from the predetermined period.

6. A light-emitting device comprising:

a display comprising a plurality of pixels in which a plurality of light-emitting elements are arranged in a predetermined pattern, a light emission color of each of the plurality of light-emitting elements being variable in accordance with the drive current; and a lighting controller configured to supply a drive current to each of the plurality of light-emitting elements and control a light emission period of each of the plurality of light-emitting elements, wherein the lighting controller is configured to:

divide one frame, in which the lighting controller drives the plurality of light-emitting elements to emit light, into a first subframe and a second subframe, drive the plurality of light-emitting elements to emit light of a first light emission color in the first subframe, and drive the plurality of light-emitting elements to emit light of a second light emission color in the second subframe, the second light emission color being different from the first light emission color, wherein each light-emitting element comprises a first light-emitting portion configured to emit light of the first light emission color and a second light-emitting portion configured to emit light of the second light emission color, and wherein light emission of the first light-emitting portion and light emission of the second light-emitting portion are selectable by a switch, wherein the first light-emitting portion and the second light-emitting portion are connected in series, wherein the light-emitting device further comprises:

a first switch connected in parallel with the first light-emitting portion; and a second switch connected in parallel with the second light-emitting portion, and wherein the first switch and the second switch are located at an intermediate point of a series connection between the first light-emitting portion and the second light-emitting portion.

7. The light-emitting device according to claim 1, wherein the first light emission color is blue.

8. The light-emitting device according to claim 7, wherein the first light emission color has a fixed wavelength.

9. A method for driving a light-emitting device comprising a display comprising a plurality of pixels in which a plurality of light-emitting elements are arranged in a predetermined pattern, a light emission color of each of the plurality of light-emitting elements being variable in accordance with a drive current supplied thereto, an information storage configured to store current-chromaticity information for determining, in accordance with a specific light emission color of a light-emitting element of the light-emitting elements, a drive current value to drive the light-emitting element to emit light of a first light emission color or a second light emission color different from the first light emission color, and a lighting controller configured to supply the drive current to each of the plurality of light-emitting elements and control a light emission period of each of the plurality of light-emitting elements, the method comprising:

driving one frame, in which the lighting controller drives the plurality of light-emitting elements to emit light, into a first subframe and a second subframe;

driving the plurality of light-emitting elements to emit light of a first light emission color in the first subframe; and driving the plurality of light-emitting elements to emit light of a second light emission color in the second subframe, the second light emission color being different from the first light emission color, wherein the driving the plurality of light-emitting elements with the lighting controller comprises:

determining a chromaticity of the second light emission color and a luminance ratio of luminance of a light-emitting element of the plurality of light-emitting elements emitting light of the first light emission color and luminance of a light-emitting element of the light-emitting elements emitting light of the second light emission color from a chromaticity signal and a luminance signal to be displayed by each pixel so as to correspond to the first light emission color, determining a light emission intensity corresponding to a luminance signal which are basis of luminance to be displayed by each of the plurality of light-emitting elements based on the chromaticity of the second light emission color and the luminance ratio, supplying the drive current having a value corresponding to the light emission color of each of the plurality of light-emitting elements to the corresponding one of the plurality of light-emitting elements by referring to the information storage with a first control circuit of the lighting controller, and controlling the light emission period of the drive current supplied by the first control circuit, in accordance with the determined light emission intensity with a second control circuit of the lighting controller.

10. The method for driving a light-emitting device according to claim 9, wherein:

the driving the plurality of light-emitting elements with the lighting controller comprises:

controlling the light emission intensity by pulse-width modulation control in the first subframe with the second control circuit while the first control circuit keeps the drive current of each of the plurality of light-emitting elements for emitting light of the first light emission color constant, and in the second subframe, controlling, by the first control circuit, a light emission color by the drive current value for driving each of the plurality of light-emitting elements emitting light of the second light emission color and controlling, by the second control circuit, luminance by a light emission period of the drive current value of each of the plurality of light-emitting elements controlled by first control circuit.

* * * * *